United States Patent
Yan

(10) Patent No.: US 10,663,852 B2
(45) Date of Patent: May 26, 2020

(54) POLARIZATION MODULATOR FOR STEREOSCOPIC PROJECTION WITH HIGH LIGHT EFFICIENCY AND POLARIZATION BEAM SPLITTING PRISM ASSEMBLY THEREOF

(71) Applicant: Dongqing Yan, Guangdong (CN)

(72) Inventor: Dongqing Yan, Guangdong (CN)

( * ) Notice: Subject to any disclaimer, the term of this patent is extended or adjusted under 35 U.S.C. 154(b) by 0 days.

(21) Appl. No.: 16/195,791

(22) Filed: Nov. 19, 2018

(65) Prior Publication Data

US 2019/0086788 A1    Mar. 21, 2019

Related U.S. Application Data

(63) Continuation of application No. PCT/CN2017/093174, filed on Jul. 17, 2017.

(30) Foreign Application Priority Data

May 18, 2016   (CN) ..................... 2016 2 0456922 U

(51) Int. Cl.
*G03B 35/26*        (2006.01)
*G02B 27/28*        (2006.01)
(Continued)

(52) U.S. Cl.
CPC ........... *G03B 35/26* (2013.01); *G02B 27/285* (2013.01); *G02B 27/288* (2013.01); *G02B 30/25* (2020.01);
(Continued)

(58) Field of Classification Search
CPC .... G03B 21/006; G03B 21/008; G03B 21/28; G03B 21/208; G03B 21/2013;
(Continued)

(56) References Cited

U.S. PATENT DOCUMENTS

| 5,657,160 A | * | 8/1997 | Miyatake | ............. | G02B 27/283 |
| | | | | | 348/E5.141 |
| 2006/0171035 A1 | * | 8/2006 | Berman | ............... | G02B 5/3016 |
| | | | | | 359/618 |
| 2010/0328614 A1 | * | 12/2010 | Ikeda | .................. | G03B 21/2073 |
| | | | | | 353/20 |

FOREIGN PATENT DOCUMENTS

| CN | 203405635 U | 1/2014 |
| CN | 203705728 U | 7/2014 |

(Continued)

OTHER PUBLICATIONS

International Search Report of PCT Patent Application No. PCT/CN2017/093174 dated Nov. 9, 2017.

*Primary Examiner* — Sultan Chowdhury

(57) ABSTRACT

A polarization modulator for stereoscopic projection comprises a polarization beam splitting prism assembly for splitting an incident beam into a transmitted beam, an upper half of reflected beam, and a lower half of reflected beam, a polarization plane rotating component for rotating the polarization plane of the transmitted beam or of the upper half of reflected beam and the lower half of reflected beam by 90 degrees, a reflective mirror for adjusting a propagation direction of the upper half of reflected beam and the lower half of reflected beam, a lens group for adjusting the range of size of the transmitted beam, a linear polarizer for filtering the beam, a polarization modulator for modulating the transmitted beam, the upper half of reflected beam and the lower half of reflected beam into counter-clockwise circularly polarized light and clockwise circularly polarized light in the order of frames, and a driving circuit.

4 Claims, 4 Drawing Sheets

(51) Int. Cl.
*G03B 35/22* (2006.01)
*G02F 1/01* (2006.01)
*G02F 1/133* (2006.01)
*G02F 1/139* (2006.01)
*H04N 13/00* (2018.01)
*G02B 30/25* (2020.01)

(52) U.S. Cl.
CPC .......... *G02F 1/0136* (2013.01); *G02F 1/1393* (2013.01); *G02F 1/13306* (2013.01); *G03B 35/22* (2013.01); *H04N 13/00* (2013.01)

(58) Field of Classification Search
CPC .... G03B 21/2073; G03B 35/10; G03B 35/16; G03B 35/22; G03B 35/26; H04N 9/315; H04N 9/3105; H04N 9/3152; H04N 9/3155; H04N 9/3167
See application file for complete search history.

(56) References Cited

FOREIGN PATENT DOCUMENTS

| CN | 204009348 U | 12/2014 |
| CN | 205103534 U | 3/2016 |
| CN | 205844736 U | 12/2016 |

\* cited by examiner

POLARIZATION MODULATOR FOR STEREOSCOPIC PROJECTION WITH HIGH LIGHT EFFICIENCY AND POLARIZATION BEAM SPLITTING PRISM ASSEMBLY THEREOF

CROSS-REFERENCE TO RELATED APPLICATIONS

The present application is a Continuation Application of PCT application No. PCT/CN2017/093174 filed on Jul. 17, 2017, which claims the priority to Chinese patent application No. 201620456922.8 filed on May 18, 2016. The contents of the above identified applications are hereby incorporated by reference.

TECHNICAL FIELD

The present invention relates to the technical field of stereoscopic projection in cinemas, and provides a polarization modulator for stereoscopic projection with higher light efficiency and polarization beam splitting prism assembly thereof.

BACKGROUND

A Chinese Utility Model patent application number CN 201320549548.2 entitled STEREOSCOPIC PROJECTION DEVICE WITH LOW THROW RATIO AND HIGH LIGHT EFFICIENCY AND STEREOSCOPIC PROJECTION SYSTEM, discloses a 3D projection light modulation device with high light efficiency, comprising essentially a polarization beam splitter assembly consisting of three isosceles right-angled prisms attached together. FIG. 1A shows two polarization beam splitting planes relative to a horizontal center line of an incident plane of the prism. When ideal parallel light is incident perpendicularly on the polarization beam splitter assembly from the patent CN 201320549548.2, light ray can be emitted normally. The reflected light ray close to the joint seam is reflected upward and downward at an angle almost parallel to the incident plane and is emitted by the upper and lower surfaces of the polarization beam splitter assembly. In a normal state, the light ray is reflected twice, by a polarization beam splitting coating and a reflective mirror, respectively. However, no lens of any digital film projector emits parallel light, and when a light ray is incident obliquely on the polarization beam splitter assembly, the light ray striking at the joint seam at the center of the polarization beam splitting prism assembly is reflected by a 45-degree polarization beam splitting surface and then arrives at the incident plane of the polarization beam splitting prism assembly. Since this surface is an interface between glass and air, light rays incident on said interface at a large angle will be totally reflected. As shown in FIG. 1B, these reflected light rays are reflected by the reflective mirror, and then arrive at the screen and finally form images. In this case, the light rays have been reflected three times in total, by the polarization beam splitting coating, the incident plane, and the reflective mirror, respectively, so that the incident light ray falling close to the joint seam at the center of the polarization beam splitter assembly eventually forms an additional inversed image on the screen, thereby causing severe impact on the image quality of the screen.

The prism configuration adopted by the present invention can avoid this technical defect presented in the technical scheme of the patent CN 201320549548.2.

SUMMARY

In view of the above technical problem, an embodiment of the present invention provides a polarization modulator for stereoscopic projection with high light efficiency.

In a first aspect of the present invention, a polarization modulator for stereoscopic projection with high light efficiency is provided, which comprises: a polarization beam splitting prism assembly comprising four prisms attached to each other, the four prisms being one isosceles right-angled prism, a first acute-angled triangular prism, a second acute-angled triangular prism identical to the first acute-angled triangular prism, and one pentagonal prism, wherein angles of each of the first acute-angled triangular prism and the second acute-angled triangular prism are 45 degrees, 45+α degrees, and 90−α degrees, angles of the pentagonal prism are an obtuse angle of 180−2α degrees, 90+α degrees, 90+α degrees, 90 degrees, and 90 degrees, wherein lengths of two shortest sides of the pentagonal prism are the same, lengths of two adjacent sides of the pentagonal prism forming the obtuse angle of 180−2α degrees are the same, wherein α is of a value greater than 0 and less than 45, wherein a first surface of the first acute-angled triangular prism facing the angle of 45 degrees is attached to one of two adjacent surfaces of the pentagonal prism forming the obtuse angle of 180−2α degrees, and wherein a second surface of the first acute-angled triangular prism facing the angle of 90−α degrees and one of two adjacent sides of the isosceles right-angled prism forming the angle of 90 degrees are attached with a first polarization beam coating layer formed therebetween, wherein a first surface of the second acute-angled triangular prism facing the angle of 45 degrees is attached to another one of the two adjacent surface of the pentagonal prism forming the obtuse angle of 180−2α degrees, and wherein a second surface of the second acute-angled triangular prism facing the angle of 90−α degrees and another one of the two adjacent surfaces of the isosceles right-angled prism forming the angle of 90 degrees are attached with a second polarization beam coating layer formed therebetween, wherein the four prisms cooperatively form a cuboid shape, a plane of the isosceles right-angled prism where a longest side lies forms an exit plane, a plane of the pentagonal prism where a longest side lies forms an incident plane, and wherein an incident beam from a digital film projector is split into a transmitted beam of a P-polarization state, an upper half of reflected beam of an S-polarization state, and a lower half of reflected beam of an S-polarization state; a first reflective mirror and a second reflective mirror, each having a reflective coating positioned on a front surface thereof, the first reflective mirror being configured to adjust a propagation direction of the upper half of reflected beam and the second reflective mirror being configured to adjust a propagation direction of the lower half of reflected beam so that, after the adjustment, the upper half of reflected beam and the lower half of reflected beam propagate in a direction same as a direction of the transmitted beam propagates, and the upper half of reflected beam, the lower half of reflected beam, and the transmitted beam are all directed to a screen; a lens group, configured to adjust a range of size of the transmitted beam, so that a size of an image projected on the screen by the transmitted beam is the same as a size of another image formed by combining two images projected on the screen respectively by the upper half of reflected beam and the lower half of reflected beam after adjustment; at least one polarization plane rotating assembly, configured to adjust a polarization plane of the transmitted beam, or to adjust polarization planes of the upper half of reflected beam and the lower half of reflected beam, so that the polarization planes of the three beams are positioned in a same plane; a first linear polarizer, a second linear polarizer and a third linear polarizer, positioned respectively in a light path of the transmitted beam, a light path of the upper half of reflected beam, and a light path of the lower half of reflected beam, and configured to filter the respective beam passing therethrough so that the respective beam is completely transformed into linearly polarized light; a first polarization modulator, a second polarization modulator and a third polarization modulator positioned respectively after the first linear polarizer, the second linear polarizer and third linear polarizer, and configured to modulate the transmitted beam, upper half of reflected beam, and lower half of reflected beam that have been filtered and have consistent polarization planes into counter-clockwise circularly polarized light and clockwise circularly polarized light in the order of frames; and a driving circuit, configured to acquire a synchronization signal from a digital film projector, and generate a driving voltage signal based on the synchronization voltage signal and apply it to the first polarization modulator, the second polarization modulator and the third polarization modulator.

In a second aspect of the present invention, a polarization beam splitting prism assembly is provided, which comprises four prisms attached to each other, the four prisms being one isosceles right-angled prism, a first acute-angled triangular prism, a second acute-angled triangular prism identical to the first acute-angled triangular prism, and one pentagonal prism, wherein angles of each of the first acute-angled triangular prism and the second acute-angled triangular prism are respectively 45 degrees, 45+α degrees, and 90−α degrees, angles of the pentagonal prism are respectively an obtuse angle of 180−2α degrees, 90+α degrees, 90+α degrees, 90 degrees, and 90 degrees, wherein lengths of two shortest sides of the pentagonal prism are the same, lengths of two adjacent sides of the pentagonal prism forming the obtuse angle of 180−2α degrees are the same, wherein α is of a value greater than 0 and less than 45, wherein a first surface of the first acute-angled triangular prism facing the angle of 45 degrees is attached to one of two adjacent surfaces of the pentagonal prism forming the obtuse angle of 180−2α degrees, and wherein a second surface of the first acute-angled triangular prism facing the angle of 90−α degrees and one of two adjacent sides of the isosceles right-angled prism forming the angle of 90 degrees are attached with a first polarization beam coating layer formed therebetween, wherein a first surface of the second acute-angled triangular prism facing the angle of 45 degrees is attached to another one of the two adjacent surface of the pentagonal prism forming the obtuse angle of 180−2α degrees, and wherein a second surface of the second acute-angled triangular prism facing the angle of 90−α degrees and another one of the two adjacent surfaces of the isosceles right-angled prism forming the angle of 90 degrees are attached with a second polarization beam coating layer formed therebetween, and the four prisms cooperatively form a cuboid shape, a plane of the isosceles right-angled prism where a longest side lies forms an exit plane, a plane of the pentagonal prism where a longest side lies forms an incident plane.

The polarization modulator for stereoscopic projection provided by the embodiment of the present invention adopts a configuration of four prisms to prevent projected light ray from forming an inversed image on the screen dude to extra reflection and enable all the projected light rays to be finally projected onto the screen, thereby improving effectively light efficiency of a stereoscopic film projection apparatus and having advantage of a compact size and simple superimposing of beams.

DESCRIPTION OF THE EMBODIMENTS

In order to make the objects, technical solutions and advantages of the present invention clearer and more apparent, the present invention will be described in further detail below with reference to the accompanying drawings and embodiments. It should be understood that the specific embodiments described herein are only intended to explain the present invention and are not to define the present invention.

Figure 1A:
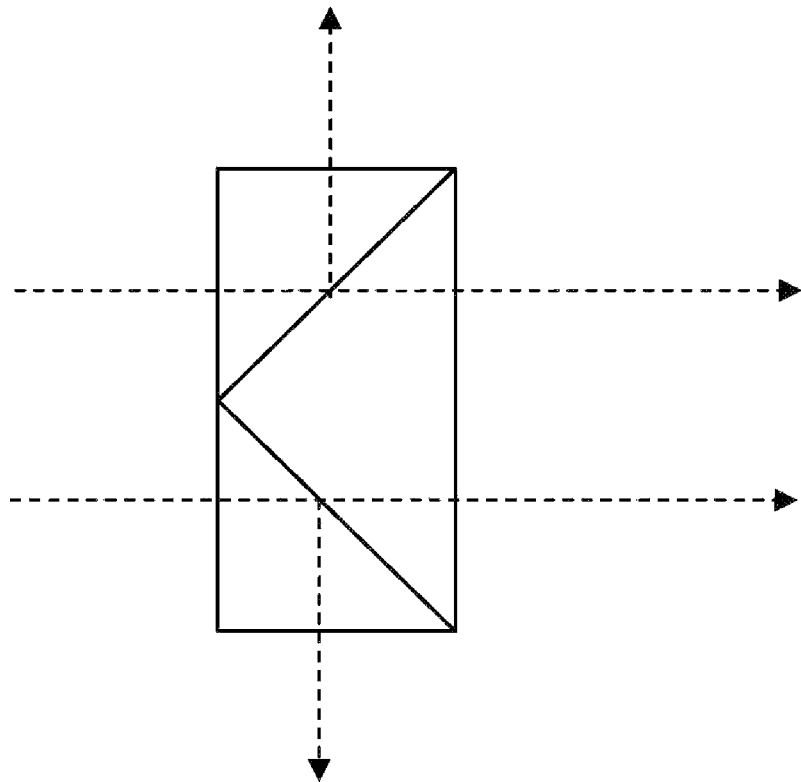
FIG. 1A is a schematic view of a polarization beam splitting assembly disclosed by the patent 201320549548.2.
Figure 1B:
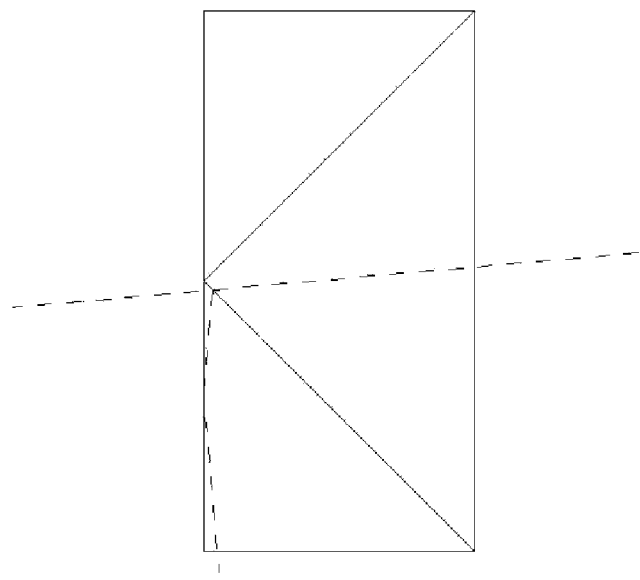
FIG. 1B schematically shows imaging by the assembly shown in FIG. 1A.
Figure 2:
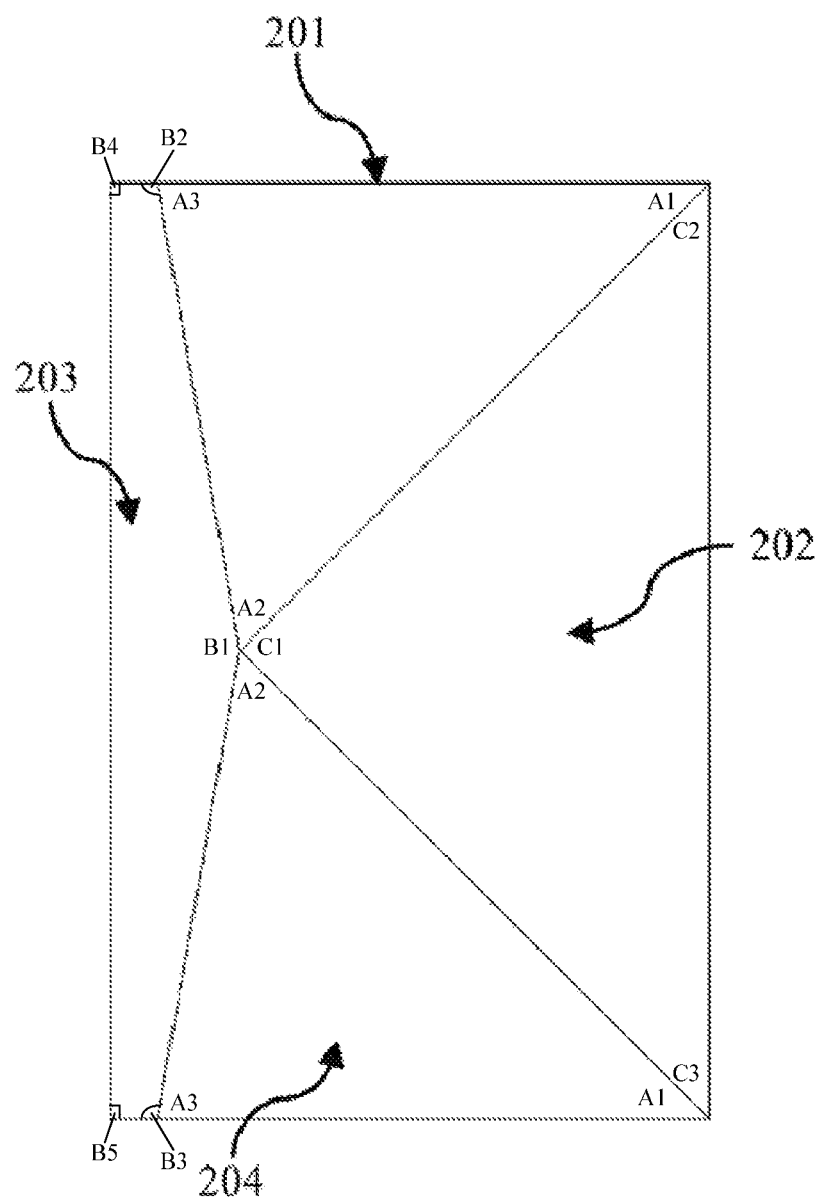
FIG. 2 is a structural view of a polarization beam splitting prism assembly according to an embodiment of the present invention.

As shown in FIG. 2, a polarization beam splitting prism assembly for a polarization modulator for stereoscopic projection with high light efficiency according to the present invention includes four prisms attached to each other, specifically, one isosceles right-angled prism 202, two identical acute-angled triangular prisms 201 and 204, and one pentagonal prism 203. Angles A1, A2 and A3 of each of the acute-angled triangular prisms 201, 204 are respectively 45 degrees, 45+α degrees, and 90−α degrees. Angles B1, B2, B3, B4 and B5 of the pentagonal prism 203 are respectively an obtuse angle of 180−2α degrees, 90+α degrees, 90+α degrees, 90 degrees, and 90 degrees. Lengths of the two shortest sides of the pentagonal prism are the same, and lengths of the two adjacent sides forming the obtuse angle B1 of 180−2α degrees are the same. Wherein α is of a value greater than 0 and less than 45. A first surface of the acute-angled triangular prism 201 facing the angle of 45 degrees is attached to one of two adjacent surfaces of the pentagonal prism 203 forming the obtuse angle of 180−2α degrees, and a second surface of the acute-angled triangular prism 201 facing the angle of 90−α degrees and one of two adjacent sides of the isosceles right-angled prism 202 forming the angle of 90 degrees are attached with a first polarization beam coating layer formed therebetween. A first surface of the acute-angled triangular prism 204 facing the angle of 45 degrees is attached to another one of the two adjacent surface of the pentagonal prism 203 forming the obtuse angle of 180−2α degrees, and a second surface of the acute-angled triangular prism 204 facing the angle of 90−α degrees and another one of the two adjacent surfaces of the isosceles right-angled prism 202 forming the angle of 90 degrees are attached with a second polarization beam coating layer formed therebetween. Namely, the apex of the isosceles right-angled prism 202 corresponding to the angle C1 of 90 degree, the apex of the acute-angled triangular prisms 201 corresponding to the angle A2 of 45+α degrees, the apex of the acute-angled triangular prisms 204 corresponding to the angle A2 of 45+α degrees, and the apex of the pentagonal prism 203 corresponding to the obtuse angle B1 of 180−2α degree are joined together, with the angle C1 of the isosceles right-angled prism 202 arranged opposite to the angle B1 of the pentagonal prism 203, and angle A2 of the acute-angled triangular prisms 201 arranged opposite to the angle A2 of the acute-angled triangular prisms 204. The four prisms cooperatively form a cuboid shape after attachment. The plane of the isosceles right-angled prism 202 where the longest side lies forms an exit plane. The plane of the pentagonal prism 203 where the longest side lies forms an incident plane. Once a light ray is incident from the pentagonal prism 203 and arrives at the surface including both legs of the isosceles right-angled prism 202, the incident light ray is split into three beams of different polarization states, i.e., a transmitted beam of a P-polarization state, an upper half of reflected beam of an S-polarization state, and a lower half of reflected beam of an S-polarization state.

According to different positioning of the polarization plane rotating assembly, the polarization modulator for stereoscopic projection having the polarization beam splitting prism assembly according to the present invention has at least two different embodiments.

Figure 3:
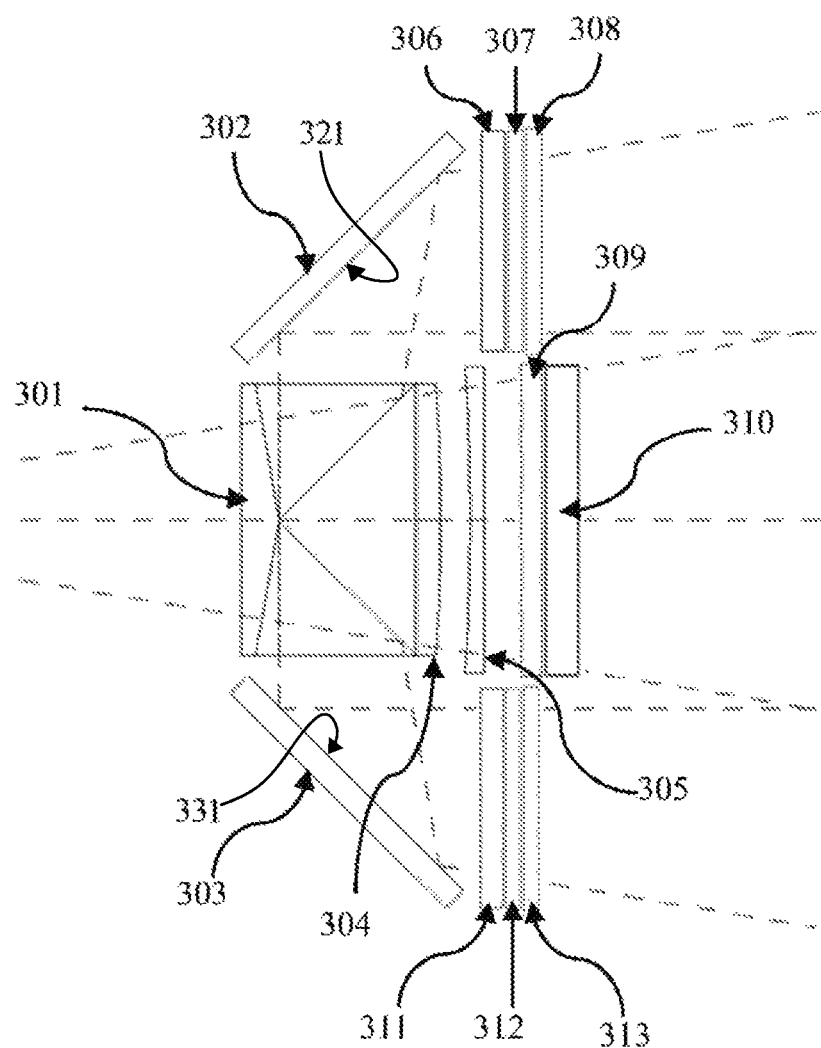
FIG. 3 shows an optical structure of a polarization modulator for stereoscopic projection according to a first embodiment of the present invention, with polarization plane rotating components respectively positioned in light paths of an upper half of reflected light beam, in a light path of a lower half of reflected light beam, and between a reflective mirror and a linear polarizer.

The light path according to a first embodiment is shown in FIG. 3. A polarization plane rotating assembly 306 is positioned between a reflective mirror 302 and a linear polarizer 307. Another polarization plane rotating assembly 311 is positioned between another reflective mirror 303 and another linear polarizer 312. In the first embodiment, the upper half of reflected beam of an S-polarization state is reflected by the reflective mirror 302 and then undergoes polarization state adjustment by the polarization plane rotating assembly 306. The lower half of reflected beam of an S-polarization state is reflected by the reflective mirror 303 and then undergoes polarization state adjustment by the polarization plane rotating assembly 311. After the adjustment, the polarization plane for said beam is at a 90-degree angle relative to its original polarization plane, and parallel to the polarization plane for the transmitted beam. That is, the adjusted beam is also in a P-polarization state. At this point, the transmitted beam, the upper half of reflected beam, and the lower half of reflected beam all of a P-polarization state are filtered by the linear polarizer 309, the linear polarizer 307, and the linear polarizer 312 respectively and transformed completely into linearly polarized light. The lens group is arranged in the light path of the transmitted beam. By adjusting the distance between the lenses 305 and 304, the size of image formed on the screen by the transmitted beam can be adjusted. The transmitted beam is filtered by the linear polarizer 309 and transformed completely into linearly polarized light. The polarization modulator 310, the polarization modulator 308, and the polarization modulator 313 respectively modulate the transmitted beam, the upper half of reflected beam, and the lower half of reflected beam that have been filtered into counter-clockwise circularly polarized light and clockwise circularly polarized light in the order of frames. By adjusting the angles of the reflective mirror 302 and the reflective mirror 303, the location of image formed on the screen by the upper half of reflected beam and lower half of reflected beam can be adjusted respectively. In combination with this as well as adjusting the relative positions of the lenses 304 and 305 in the lens group, a first image projected on the screen by the transmitted beam is superimposed onto a second image and form into a single image, wherein the second image is formed by combining two images projected on the screen respectively by the upper half of reflected beam and lower half of reflected beam. A driving circuit is configured to acquire a synchronization signal from the digital film projector, and generate a driving voltage signal based on the synchronization signal and apply it to the polarization modulator 310, the polarization modulator 308, and the polarization modulator 313. The driving circuit is not shown in FIG. 3. In practice, the polarization plane rotating assembly 306 may alternatively be positioned between the polarization beam splitting prism assembly 301 and the reflective mirror 302, and the polarization plane rotating assembly 311 may alternatively be positioned between the polarization beam splitting prism assembly 301 and the reflective mirror 303. In order to reduce interfacial reflection, the adjacent planes of two inactive optical components are typically adhered to each other by optical adhesive in practice.

Figure 4:
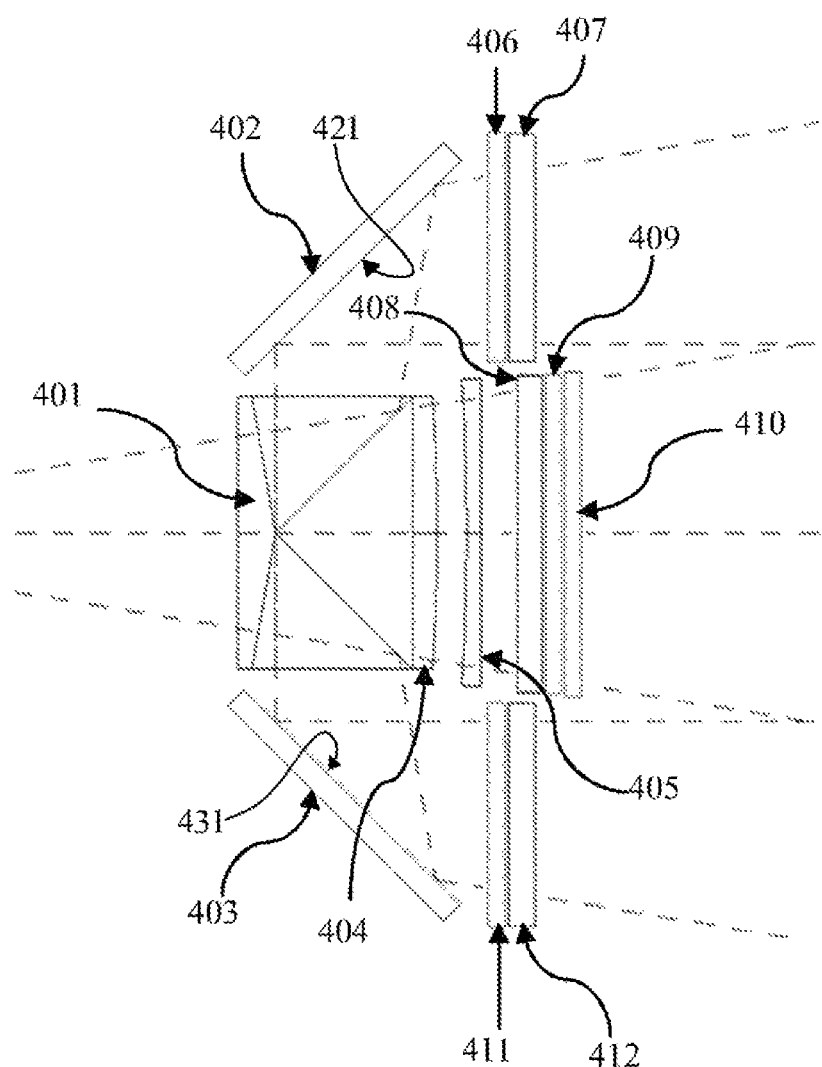
FIG. 4 shows an optical structure of a polarization modulator for stereoscopic projection according to a second embodiment of the present invention, with a polarization plane rotating components positioned in a light path of a transmitted beam, and between a lens group and a linear polarizer.

The light path according to a second embodiment is shown in FIG. 4. A polarization plane rotating assembly 408 is arranged in the light path of the transmitted beam, and between a lens 405 and a linear polarizer 409. In the second implementation, the upper half of reflected beam of an S-polarization state remains in the S-polarization state after being reflected by a reflective mirror 402. The lower half of reflected beam of an S-polarization state remains in the S-polarization state after being reflected by a reflective mirror 403. The transmitted beam of a P-polarization state exits from the polarization beam splitting prism assembly 401 and then passes through the lens 404 and 405, and remains in the P-polarization state. Thereafter, its polarization state is adjusted and transformed by the polarization plane rotating assembly 408 into an S-polarization state. At this point, the polarization plane of the adjusted beam is at an angle of 90 degrees relative to the original polarization plane and parallel to the polarization plane of the two reflected beams. That is, the adjusted beam is in an S-polarization state too. At this point, the transmitted beam, the upper half of reflected beam, and the lower half of reflected beam of the S-polarization state, all are filtered by the linear polarizer 406, the linear polarizer 409, and the linear polarizer 411 respectively and completely transformed into linearly polarized light. The polarization modulator 410, the polarization modulator 407, and the polarization modulator 412 respectively modulate the transmitted beam, the upper half of reflected beam, and the lower half of reflected beam that have been filtered into counter-clockwise circularly polarized light and clockwise circularly polarized light in the order of frames. By adjusting positioning angles of the reflective mirror 402 and the reflective mirror 403, the locations of images formed on the screen by the upper half of reflected beam and the lower half of reflected beam are adjusted respectively. In combination with this as well as adjusting relative positions of the lenses 404 and 405 in the lens group, a first image projected on the screen by the transmitted beam can be superimposed with a second image and form into a single image on the screen, wherein the second image is formed by combining two images projected on the screen respectively by the upper half of reflected beam and the lower half of reflected beam. A driving circuit is configured to acquire a synchronization signal from the digital film projector and generate a driving voltage signal based on the synchronization signal and apply it to the polarization modulator 410, the polarization modulator 407, and the polarization modulator 412. The driving circuit is not shown in FIG. 4. In practice, the polarization plane rotating assembly 408 may alternatively be positioned between the polarization beam splitting prism assembly 401 and the lens 404, or between the lenses 404 and 405. In order to reduce interfacial reflection, the adjacent planes of two inactive optical components are typically adhered to each other by optical adhesive in practice.

The foregoing describes only preferred embodiments of the present invention and is not intended to limit the present invention, and any modification, equivalent substitution, and improvement made within the spirit and principle of the present invention shall fall within the scope of protection of the present invention.

What is claimed is:

1. A polarization modulator for stereoscopic projection with high light efficiency, comprising:

a polarization beam splitting prism assembly, comprising four prisms attached to each other, the four prisms being one isosceles right-angled prism, a first acute-angled triangular prism, a second acute-angled triangular prism identical to the first acute-angled triangular prism, and one pentagonal prism, wherein angles of each of the first acute-angled triangular prism and the second acute-angled triangular prism are 45 degrees, 45+α degrees, and 90−α degrees, angles of the pentagonal prism are an obtuse angle of 180−2α degrees, 90+α degrees, 90+α degrees, 90 degrees, and 90 degrees, wherein lengths of two shortest sides of the pentagonal prism are the same, lengths of two adjacent sides of the pentagonal prism forming the obtuse angle of 180−2α degrees are the same, wherein a is of a value greater than 0 and less than 45, wherein a first surface of the first acute-angled triangular prism facing the angle of 45 degrees is attached to one of two adjacent surfaces of the pentagonal prism forming the obtuse angle of 180−2α degrees, and wherein a second surface of the first acute-angled triangular prism facing the angle of 90−α degrees and one of two adjacent sides of the isosceles right-angled prism forming the angle of 90 degrees are attached with a first polarization beam coating layer formed therebetween, wherein a first surface of the second acute-angled triangular prism facing the angle of 45 degrees is attached to another one of the two adjacent surface of the pentagonal prism forming the obtuse angle of 180−2α degrees, and wherein a second surface of the second acute-angled triangular prism facing the angle of 90−α degrees and another one of the two adjacent surfaces of the isosceles right-angled prism forming the angle of 90 degrees are attached with a second polarization beam coating layer formed therebetween, wherein the four prisms cooperatively form a cuboid shape, a plane of the isosceles right-angled prism where a longest side lies forms an exit plane, a plane of the pentagonal prism where a longest side lies forms an incident plane, and wherein an incident beam is split into a transmitted beam of a P-polarization state, an upper half of reflected beam of an S-polarization state, and a lower half of reflected beam of an S-polarization state;

a first reflective mirror and a second reflective mirror, each having a reflective coating positioned on a front surface thereof, the first reflective mirror being configured to adjust a propagation direction of the upper half of reflected beam and the second reflective mirror being configured to adjust a propagation direction of the lower half of reflected beam so that, after the adjustment, the upper half of reflected beam and the lower half of reflected beam propagate in a direction same as a direction of the transmitted beam propagates, and the upper half of reflected beam, the lower half of reflected beam, and the transmitted beam are all directed to a same direction;

a lens group, configured to adjust a range of size of the transmitted beam, so that a size of a projected image by the transmitted beam is the same as a size of another image formed by combining two projected images respectively by the upper half of reflected beam and the lower half of reflected beam after adjustment;

at least one polarization plane rotating assembly, configured to adjust a polarization plane of the transmitted beam, or to adjust polarization planes of the upper half of reflected beam and the lower half of reflected beam, so that the polarization planes of the three beams are positioned in a same plane;

a first linear polarizer, a second linear polarizer and a third linear polarizer, positioned respectively in a light path of the transmitted beam, a light path of the upper half of reflected beam, and a light path of the lower half of reflected beam, and configured to filter the respective beam passing therethrough so that the respective beam is completely transformed into linearly polarized light;

a first polarization modulator, a second polarization modulator and a third polarization modulator positioned respectively after the first linear polarizer, the second linear polarizer and third linear polarizer, and configured to modulate the transmitted beam, upper half of reflected beam, and lower half of reflected beam that have been filtered and have a consistent P-polarization state or a consistent S-polarization state into counter-clockwise circularly polarized light and clockwise circularly polarized light in an order of frames of the projected image.

2. The polarization modulator for stereoscopic projection with high light efficiency according to claim 1, wherein the lens group at least comprises one concave lens and one convex lens, the concave lens and the convex lens having main optical axes coaxial to each other, and the concave lens and the convex lens having an adjustable spacing therebetween.

3. A polarization beam splitting prism assembly comprising: four prisms attached to each other, the four prisms being one isosceles right-angled prism, a first acute-angled triangular prism, a second acute-angled triangular prism identical to the first acute-angled triangular prism, and one pentagonal prism, wherein angles of each of the first acute-angled triangular prism and the second acute-angled triangular prism are respectively 45 degrees, 45+α degrees, and 90−α degrees, angles of the pentagonal prism are respectively an obtuse angle of 180−b 2α degrees, 90+α degrees, 90+α degrees, 90 degrees, and 90 degrees, wherein lengths of two shortest sides of the pentagonal prism are the same, lengths of two adjacent sides of the pentagonal prism forming the obtuse angle of 180−b 2α degrees are the same, wherein α is of a value greater than 0 and less than 45, wherein the four prisms cooperatively form a cuboid shape, a plane of the isosceles right-angled prism where a longest side lies forms an exit plane, a plane of the pentagonal prism where a longest side lies forms an incident plane.

4. The polarization beam splitting prism assembly according to claim 3, wherein a convex lens is attached to the exit plane, the convex lens having a convex surface facing outward, and a plane surface opposite to the convex surface and attached to the exit plane.

\* \* \* \* \*